May 3, 1960     O. P. MONSON     2,935,293

VALVE

Filed June 13, 1955     2 Sheets-Sheet 1

Oscar P. Monson,
Inventor.
Koenig and Pope,
Attorneys.

May 3, 1960  O. P. MONSON  2,935,293
VALVE

Filed June 13, 1955  2 Sheets-Sheet 2

Oscar P. Monson,
Inventor.
Koenig and Pope,
Attorneys.

United States Patent Office

2,935,293
Patented May 3, 1960

2,935,293

VALVE

Oscar P. Monson, Kenosha, Wis., assignor to Monson Equipment Company, Inc., Kenosha, Wis., a corporation of Wisconsin Application June 13, 1955, Serial No. 514,819

5 Claims. (Cl. 251—316)

This invention relates to valves, and more particularly to valves adapted for use as, or in, faucets and the like. The invention is an improvement upon the constructions shown in my United States Patents 2,583,869 and 2,696,363.

Among the several objects of the invention may be noted the provision of an improved valve wherein on and off control movements of a heatproof handle may be accomplished quietly and with extreme ease, unhampered by the usual rubbing at a squeezed stem seal packing; the provision of a valve of the class described wherein all packing is between stationary members, thus eliminating all friction, chattering and packing wear such as usually occurs due to rubbing movements on such squeezed packing; the provision of a valve of the class described which is positively leakproof over extremely long periods of time, both as regards leakage through its outlet and past its control stem; and the provision of a valve of the class described which is relatively simple in construction, economical to produce and one upon which any repairs that may possibly be required may be easily made. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a vertical section through a faucet embodying the invention;

Corresponding reference characters indicate corresponding parts throughout the several views of the drawings.

Figure 5:
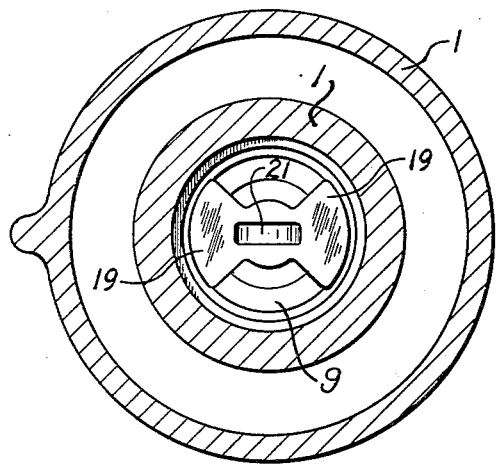
Fig. 5 is a cross section taken on line 5—5 of Fig. 1, a key having been removed; and, Fig. 6 is a cross section taken on line 6—6 of Fig. 1.
Figure 6:
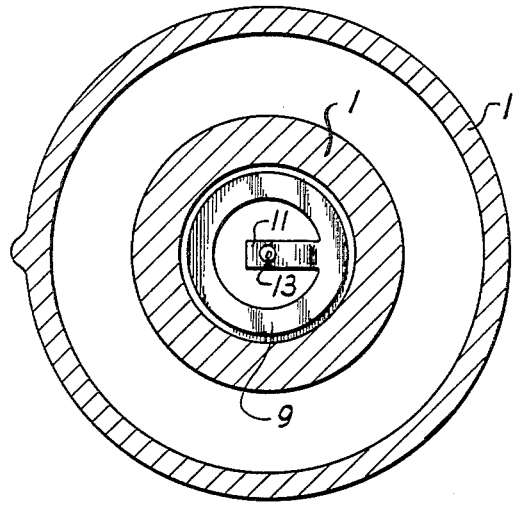

Referring now more particularly to the drawings, there is shown at numeral 1 a hollow body having interior coaxial circular compartments to be described. It has an outlet 3 and a threaded inlet 5. At the upper end of the inlet 5 is a shoulder 7 which is located at the bottom of a counterbore 8. On shoulder 7 rests an annular spring brass washer 9 having an upwardly directed spring finger 11, the latter being provided with a central tip 13 which springingly and centrally engages a small bottom platform 15 on a movable valve plate 17. Above the platform is a blind slot or notch 21. The plate 17 has two lobes 19 extending oppositely from the platform 15 (Fig. 5). The plate is hard, being composed of a noncorrosive tantalum-tungsten alloy steel which is ground and flat-lapped on its upper surface to optical accuracy. It is biased by the tip 13 against the flat-lapped bottom of a stationary valve seat 23. The latter is composed of an upper brass backing portion 25 to which is attached a bottom facing 27 composed also of the same hard tantalum-tungsten alloy. The bottom surface of facing 27 is also ground and flat-lapped to optical accuracy. This bottom surface is supported upon a shoulder 41.

The valve seat 23 has two opposite passages or ports 29 (Fig. 4) which, upon 90° rotation of the valve plate 17, are covered and uncovered by the lobes 19 (Fig. 5). While the plate 17 is biased to a seat on the valve seat 23 by spring 11, and additionally by the water pressure when the plate is in closed position, it also is maintained in seating condition by the clinging action between the flat-lapped faces of the plate and seat obtained by initially engaging them sidewise, as may be done with any sufficiently accurate flat-lapped surfaces.

The backing portion 25 is beveled, as shown at 31, where it is engaged by a flaring lead wedging bushing 33 having a lower feather edge 34. Bushing 33 is backed by a threaded annular collar 35, screwed into internal threads 37 in the body 1. This collar 35 is provided with slots 36 for application of a suitable spanner wrench. An end nose 39 on collar 35 engages the upper side of the seat 23 to force it into engagement with the shoulder 41 at the bottom of a counterbore 42 and to prevent inward movement at this point of the squeezed lead of bushing 33. The diameter of the seat 23 is substantially less than the bore into which the collar 35 is threaded, but the bushing 33, when forced down by 35 centers, wedges and seals seat 23 at its periphery. The inside diameter of the collar 35 is large enough to communicate with both of the ports 29 in the valve seat 23.

Figure 1:
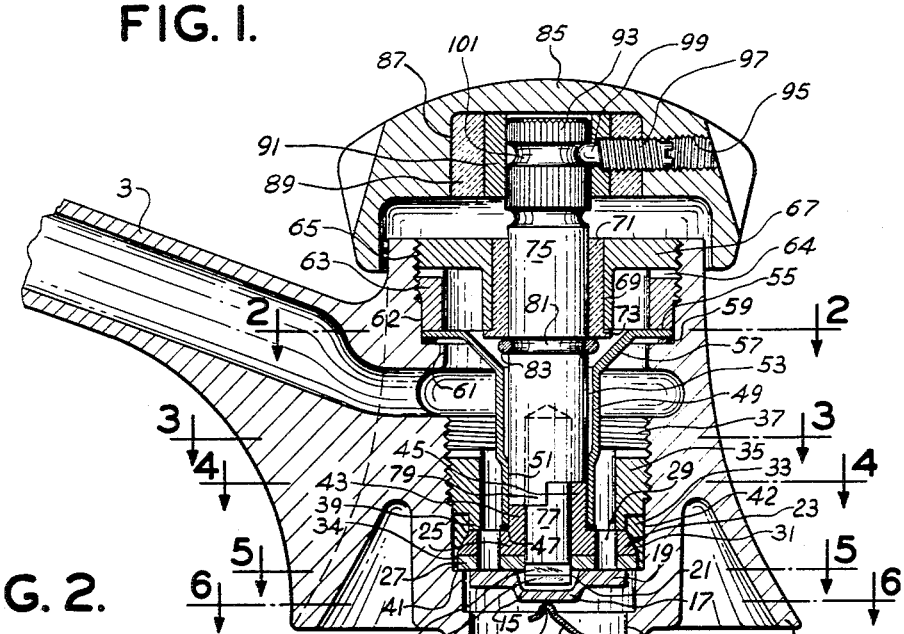
Figure 2:
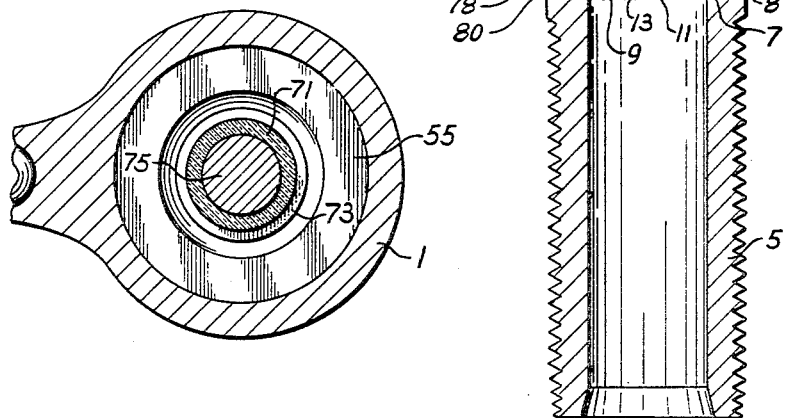
Fig. 2 is a cross section taken on line 2—2 of Fig. 1.
Figure 3:
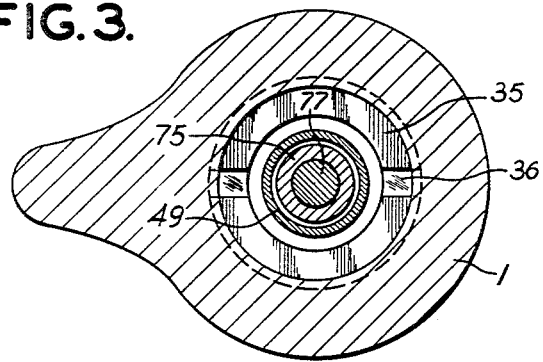
Fig. 3 is a cross section taken on line 3—3 of Fig. 1.

A central tubular portion 43 extends up from the seat 23. It is castellated at its upper end to form an arcuate stop member 45 subtending an angle of 135°. A sealing washer 47 surrounds the base of the tubular portion 43. This washer is engaged by the end of a jacket-forming imperforate sleeve or dam 49, the lower end of which fits snugly around tubular portion 43, as indicated at 51. At a higher region the sleeve is slightly larger, as indicated at 53. At its extreme upper end, the larger portion 53 is connected by means of a conical portion 57 with a flange 55. The flange 55 is supported on a sealing washer 59, located on a shoulder 61, the latter being located at the bottom of a counterbore 62. A lock ring 63 is threaded into threads 65 in the body 1 and serves to force the flange 55 into sealing engagement with the washer 59. The lock ring 63 is provided with slots 64, for application of a suitable spanner type of wrench (Fig. 1).

The threads 65 also receive a stem guide ring 67 which seats on ring 63 and has a central sleeve 69 in which is located an antifriction bushing 71 composed, for example, of solid nylon. A flange 73 on the lower end of bushing 71 engages the end of the sleeve 69.

Figure 4:
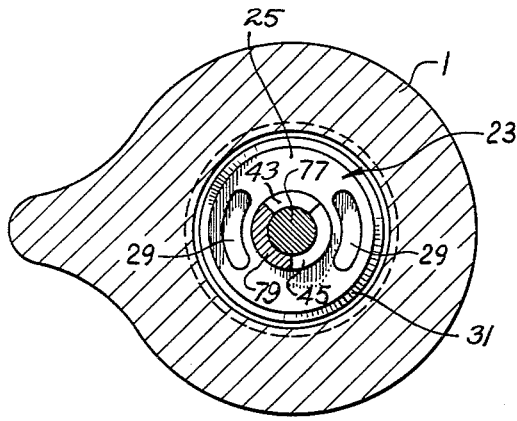
Fig. 4 is a cross section taken on line 4—4 of Fig. 1, a stem seal and lock ring having been removed.

At numeral 75 is shown a valve stem, the lower end of which is hollow for reception with a tight press fit of an operating key 77. The members 75 and 77 rotate as a unit. The key 77 is provided at its lower end with a reduced portion 78 having transverse side edges 80 for loose engagement within the sides of elongate slot 21 in the rotary valve plate 17. The lower end of the stem 75 is also castellated. This forms a rotary stop 79 subtending an angle of 135° and is engageable with the stationary castellated stop 45 (Fig. 4). Engagements between 79 and 45, upon rotation of the stem, occur over a 90° interval to bring the valve plate 17 into 90° open and closed positions.

The stem 75 is provided with a groove 81 in which is a spring snap ring 83 adapted to prevent upward withdrawal of the stem 75 after assembly. It is to be understood that the nylon bushing 71 is not in the nature of a squeeze type of resilient packing but functions as a non-chattering antifriction bearing for the upper end of the stem 75. It does not, and need not form a liquid seal, for, as is clear, the stationary sleeve 49 seals off the water chamber of the faucet above seat 23 from the stem 75 and the valve plate 17 seals off the lower opening in the tubular portion 45 in which the key 77 rotates.

At numeral 85 is shown a suitable metal handle on the bottom of which is a cup-shaped opening or socket 87 for receiving with a forced fit a heat-insulating bushing 89 composed, for example, of melamine-impregnated canvas. Into the bushing 89 is press-fitted a brass bushing 91, the inside of which is serrated to cooperate with a serrated head 93 of the stem 75. A threaded opening 95 traverses the handle, including parts 89 and 91. This opening 95 receives a threaded set screw 97, the nose 99 of which engages with a peripheral groove 101 in the head 93. The serrated connection between head 93 and bushing 91 forms a driving connection between the handle 85 and stem 75, and the set screw 97 serves to take out any slack between the serrations, so that the handle will not wobble.

Assembly is accomplished by first inserting the spring washer 9 in position on the shoulder 7. The flat-lapped valve plate 17 may then be engaged with the flat-lapped bottom surface of the valve seat 23 and the assembly inserted into the body 1 from the top, the raised portion 15 engaging the spring tip 13. Due to the close flat-lapped fit, parts 17 and 23 cling together sufficiently as an assembly for insertion as such. Then the bushing 33 is dropped into place and followed by threading down the collar 35, so as to squeeze the bushing 33 into position around the seat 23. It thus acts as a peripheral seal.

Next the washer 47 is applied around the tubular portion 43 and the washer 59 placed on the shoulder 61. Then the lower end 51 of the sleeve 49 is telescoped over the collar 35 into engagement with the washer 47, which places the flange 55 into engagement with the preplaced washer 59. Then the lock ring 63 is screwed home, which has the effect of pressing down the sleeve 49 and squeezing both washers 47 and 59 into fixed positions.

Assuming next that the snap ring 83 has been placed in groove 81 and key 77 has been press-fitted into the stem 75, this assembly is introduced from the upper end of the body 1, through the jacket 49 and tubular portion 43, so as to place the end parts 78, 80 of the key 77 loosely in the slot 21. Next the guide ring 67, with its bushing 71 in place, is telescoped over the stem 75 and threaded into position against ring 63. This places the flange 73 just above the snap ring 83. The result is that the valve plate 17 may be driven to rotate by rotating the stem 75, the latter being axially positioned. However, the valve plate 17, not being rigidly attached to the key 77, is free to compensate for any slight eccentricity between them. Thus the valve plate always maintains its lap-fitted engagement with member 27 without interference from any stem misalignment.

Finally, assuming that the parts 85, 89 and 91 have been assembled, the handle 85 is applied to the serrated head 93 and the set screw 97 tightened. The parts are then as shown in Fig. 1.

Operation is as follows:

To cut off flow, the handle 85 is turned until the fixed stop 45 on the valve seat 23 is engaged by the rotary stop 79 on the valve stem 75, which places the lobes 19 of the valve plate 17 over the ports 29. To turn on the flow, turning of the handle 85 is reversed, so as to bring the movable stop 79 against the opposite side of the fixed stop 45, thus causing the lobes 19 to uncover the ports 29. Liquid then flows through the ports 29 and collar 35, around the stationary sealed sleeve 49, and thence to the outlet 3. The stem is entirely separated from the water compartment above the seat 23 by the presence of the sealed jacket sleeve 49 and from the water compartment below by the valve plate 17. It will be noted that there is no squeezed packing on the stem 75, both washers 47 and 59 being stationary. No such packing is required between the nylon antifriction bushing 71 and the stem 75. The efficient seal between the flat-lapped valve plate 17 and the valve seat 23 serves to seal off water from the stem parts 75, 77, both when the valve is closed and when it is open.

The force required to turn the handle 85 is slight, because there is substantially no resisting torque due to the pressure from the centrally located spring tip 13. The only small resisting torque is that of friction of the non-packed rotary valve plate 17 and of the nonpacked stem parts. The flat-lapped sealing engagement between parts 17 and 27 is accurately maintained at all times without interference due to any possible misalignment between the key 77 and the rotary valve plate 17. Friction between the nylon bushing 71 and the valve stem 75 being very low, there is substantially no tendency to chatter or squeal. Also, heat conduction from any hot liquid transmitted through to the stem 75 is substantially blocked at the heat-insulating bushing 89.

The need for repairs on this faucet is extremely remote, since the optically accurate hard lapped surfaces of members 17 and 23 exclude from between them any wearing material such as may pass through the faucet with a liquid; for example, hard water deposits, grit, sand and the like. The washers 47 and 59 are not subject to rubbing and last indefinitely. Wear is slight on the nylon bushing 71. However, if repairs are required, they are easy to make, as by reversing the assembly operations above described for the purpose of opening the faucet and making whatever replacements are required and then reassembling. There are no packing operations requiring any substantial degree of skill.

Summarizing, the valve may be stated to consist of a hollow body divided into first and second liquid compartments. The first one is below the valve seat 23 and the second one is above it. These compartments are connected by ports 29 in the seat and also by the central opening through the seat for a valve stem part, which is permanently covered by the valve plate 17. The body also has a third dry compartment separated from the second liquid compartment by the sleeve 49. This dry compartment is within and above said sleeve 49. It has an outside opening provided by the bushing 71. The valve stem parts pass through this outside opening and through the opening in the valve seat 23, being thereby all located in the dry compartment. It is these features that allow the use of the stationary washers or seals 47 and 59 without the necessity for squeeze type packing material being used against the stem. The particular concentric structure carrying out the above arrangement is very simple in form and easily assembled and disassembled.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A valve for faucets and the like comprising a body having a first relatively large bore at one end, a second bore at the other end providing an inlet, and a third intermediate bore having a liquid outlet, a control stem extending through the large bore, a valve seat dividing the second bore from the intermediate bore, said valve seat having a central opening for passage therethrough of an end portion of the stem and having at least one lateral liquid passage, a rotary valve plate on the inlet side of said valve seat having an operative connection with one end portion of the stem which extends through the central opening, said plate sealing off entry of liquid from the inlet to said opening and the stem, said plate having valving surfaces which upon movement by said stem control fluid flow through said lateral passage, an imperforate sleeve surrounding said stem, a sealing means on the outlet side of the valve seat and surrounding the stem, said sleeve extending into said first bore wherein it is provided with an outwardly directed flange, a member adjustably mounted in said first bore and pressing said flange into sealing engagement with said body and the opposite end of said sleeve into engagement with said sealing means on the valve seat, whereby a tight seal is obtained, said first relatively large bore providing space for an additional member adjustably mounted in said first bore and providing a substantial bearing for said stem beyond the flanged end of the sleeve.

2. A valve for faucets and the like according to claim 1, wherein said bearing is constituted by an antifriction bushing within said additional member.

3. A valve for faucets and the like according to claim 2, wherein said stem adjacent said additional member is provided with flange-forming means abutting said bushing to limit axial movement of the stem.

4. A valve for faucets and the like according to claim 3, wherein said flange-forming means is constituted by a groove in the stem and a snap ring therein.

5. A valve for faucets and the like according to claim 1, wherein cooperating stop means are provided within said sleeve on the stem and on said valve seat limiting rotary movement of said stem.

References Cited in the file of this patent

UNITED STATES PATENTS

| | | |
|---|---|---|
| 342,853 | Whitlock | June 1, 1886 |
| 1,106,933 | Farley | Aug. 11, 1914 |
| 1,522,353 | Whiteman | Jan. 6, 1925 |
| 1,673,932 | Baxter | June 19, 1928 |
| 2,021,731 | Leins | Nov. 19, 1935 |
| 2,032,316 | Cotton | Feb. 25, 1936 |
| 2,191,304 | Ashendorf | Feb. 20, 1940 |
| 2,696,363 | Monson | Dec. 7, 1954 |

FOREIGN PATENTS

| | | |
|---|---|---|
| 21,287 | Sweden | of 1906 |